United States Patent
Venkatraman et al.

(10) Patent No.: US 9,462,413 B2
(45) Date of Patent: Oct. 4, 2016

(54) METHODS AND APPARATUSES FOR USER-BASED POSITIONING AND ASSISTANCE DATA

(71) Applicant: QUALCOMM Incorporated, San Diego, CA (US)

(72) Inventors: Sai Pradeep Venkatraman, Santa Clara, CA (US); Saumitra Mohan Das, Santa Clara, CA (US); Weihua Gao, San Jose, CA (US); Vinay Sridhara, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 14/213,595

(22) Filed: Mar. 14, 2014

(65) Prior Publication Data

US 2015/0264521 A1    Sep. 17, 2015

(51) Int. Cl.
| | |
|---|---|
| *H04M 1/66* | (2006.01) |
| *H04W 4/02* | (2009.01) |
| *G01C 21/20* | (2006.01) |
| *H04W 4/04* | (2009.01) |
| *H04W 12/08* | (2009.01) |
| *H04W 12/06* | (2009.01) |
| *H04L 29/06* | (2006.01) |

(52) U.S. Cl.
CPC .............. *H04W 4/02* (2013.01); *G01C 21/206* (2013.01); *H04W 4/021* (2013.01); *H04W 4/043* (2013.01); *H04W 12/08* (2013.01); *H04L 63/0807* (2013.01); *H04L 63/105* (2013.01); *H04W 12/06* (2013.01)

(58) Field of Classification Search
CPC ................................. H04W 4/02; G01C 21/20
USPC .................... 707/723; 455/457, 456.6, 39
See application file for complete search history.

(56) References Cited

U.S. PATENT DOCUMENTS

| | | | |
|---|---|---|---|
| 6,397,074 B1 | 5/2002 | Pihl et al. | |
| 6,671,377 B1 | 12/2003 | Havinis et al. | |
| 2004/0138807 A1* | 7/2004 | Jha ..................... | H04W 4/02 455/456.2 |
| 2010/0121567 A1 | 5/2010 | Mendelson | |
| 2011/0032146 A1 | 2/2011 | Halivaara et al. | |
| 2011/0081918 A1* | 4/2011 | Burdo .................... | G01C 21/20 455/456.1 |
| 2013/0016006 A1 | 1/2013 | Ashjaee et al. | |
| 2013/0091130 A1* | 4/2013 | Barrow ............. | G06F 17/30864 707/723 |

(Continued)

FOREIGN PATENT DOCUMENTS

| | | |
|---|---|---|
| WO | 2011154769 A1 | 12/2011 |
| WO | 2013049703 A2 | 4/2013 |

OTHER PUBLICATIONS

International Search Report and Written Opinion—PCT/US2015/015384—ISA/EPO—May 6, 2015.

*Primary Examiner* — David Q Nguyen
(74) *Attorney, Agent, or Firm* — Silicon Valley Patent Group LLP (57) ABSTRACT

Methods and apparatuses of providing assistance data of a venue to a mobile device are disclosed. According to aspects of the present disclosure, for the same area, multiple or different versions of assistance data may be generated. Restrictions may be applied by access area, such that positioning grid, heat maps, and maps can be restricted to certain sections of the venue; and point of interests (POIs) and search features may be provided based on at least one of user credentials, time-based restrictions, ticket-based restrictions, or loyalty-based restrictions, or any combination thereof.

30 Claims, 9 Drawing Sheets

(56) References Cited

U.S. PATENT DOCUMENTS

| | | | | |
|---|---|---|---|---|
| 2014/0342662 A1* | 11/2014 | Das | ............ | H04W 4/02 455/39 |
| 2015/0065178 A1* | 3/2015 | Beauregard | ............ | G01S 5/0252 455/456.6 |
| 2015/0172865 A1* | 6/2015 | Emadzadeh | ............ | H04W 4/023 455/457 |

* cited by examiner

METHODS AND APPARATUSES FOR USER-BASED POSITIONING AND ASSISTANCE DATA

FIELD

The present disclosure relates to the field of wireless communications. In particular, the present disclosure relates to methods and apparatuses for providing user-based positioning and/or assistance data.

BACKGROUND

In conventional indoor positioning systems, the same assistance data (AD) and maps of a venue are often presented to all users. In addition, positioning may be provided to all users on all location context identifiers that may be deployed for positioning. As used herein, a location context identifier (LCI) may refer to information capable of identifying an area or location. Different LCIs may identify or characterize an area, for example, an area for which navigation assistance data may be available. One drawback of such conventional systems is that they may not provide differentiations in quality of services. Another drawback of such conventional systems is that they may generate assistance data for areas in the venue where the users may not be allowed to access, which may lead to unnecessarily consumption of computing resources and transmission bandwidth. Yet another drawback of such conventional systems is that they may generate assistance data of the venue where the users may not be interested, which may lead to less desirable user experiences.

SUMMARY

Methods and apparatuses for providing user-based positioning and/or assistance data are disclosed. According to aspects of the present disclosure, for the same LCI, multiple or different versions of assistance data may be generated. Restrictions may be applied by access area, such that positioning grid, heat maps, and maps can be restricted to certain sections of the venue; and point of interests (POIs) and search features may be provided based on at least one of user credentials, time-based restrictions, ticket-based restrictions, or loyalty-based restrictions, or any combination thereof.

In one embodiment, a method of providing assistance data may include receiving a request to access the assistance data of a venue from a mobile device, retrieving user credentials associated with the mobile device, determining a privilege of the mobile device to access the venue based at least in part on the user credentials, and providing the assistance data of the venue to the mobile device, based at least in part on the privilege of the mobile device to access the venue.

In another embodiment, an apparatus for providing assistance data may include a database configured to store user credentials, one or more processors that include processing logic, and a memory configured to store the assistance data of the venue. The processing logic comprises logic configured to receive a request to access assistance data of a venue from a mobile device, logic configured to retrieve the user credentials associated with the mobile device from the database, logic configured to determine a privilege of the mobile device to access the venue based at least in part on the user credentials, and logic configured to provide the assistance data of the venue to the mobile device, based at least in part on the privilege of the mobile device to access the venue.

In yet another embodiment, a computer program product includes non-transitory medium storing instructions for execution by one or more computer systems. The instructions comprises instructions for receiving a request to access assistance data of a venue from a mobile device, instructions for retrieving user credentials associated with the mobile device, instructions for determining a privilege of the mobile device to access the venue based at least in part on the user credentials, and instructions for providing the assistance data of the venue to the mobile device, based at least in part on the privilege of the mobile device to access the venue.

In yet another embodiment, an apparatus comprises means for receiving a request to access assistance data of a venue from a mobile device, means for retrieving user credentials associated with the mobile device, means for determining a privilege of the mobile device to access the venue based at least in part on the user credentials, and means for providing the assistance data of the venue to the mobile device, based at least in part on the privilege of the mobile device to access the venue.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings. Like numbers are used throughout the figures.

DESCRIPTION OF EMBODIMENTS

Embodiments of providing user-based positioning and/or assistance data of a venue to a mobile device are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the widest scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1A:
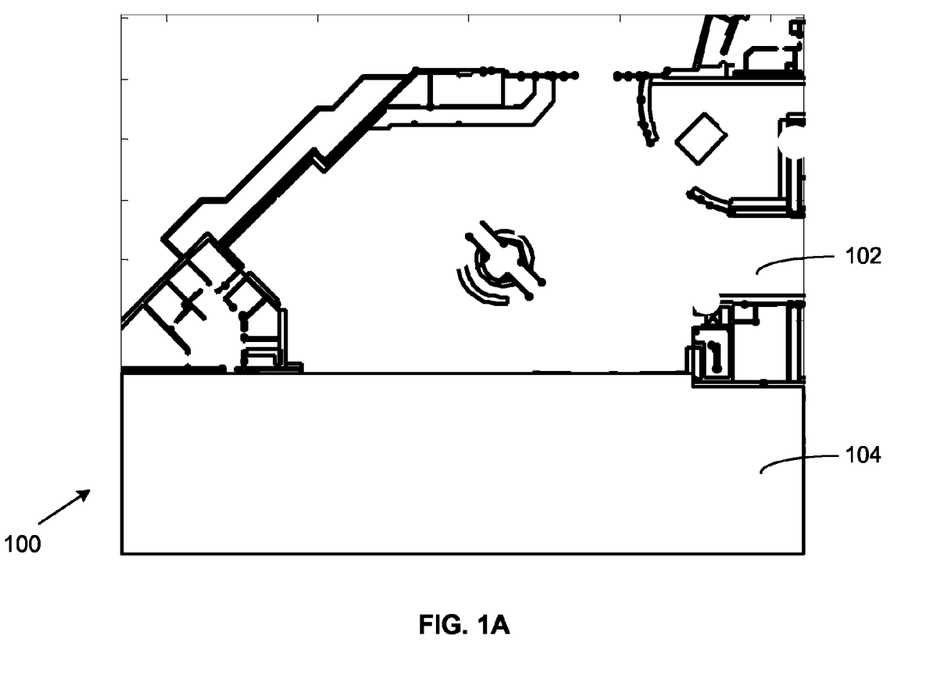
FIG. 1A illustrates an exemplary implementation of providing assistance data of a venue according to aspects of the present disclosure.

FIG. 1A illustrates an exemplary implementation of providing assistance data of a venue according to aspects of the present disclosure. In this example, venue 100 may include a retail section 102 and a back-office section 104. According to aspects of the present disclosure, a venue, such as venue 100, may provide characteristics of its environment available for access. For example, schematic maps of indoor/outdoor environment of the venue, together with locations of wireless transmitters may be obtained. More specifically, one or more schematic maps or other indoor/outdoor environment characteristics may be provided to a mobile device in the form of assistance data.

In addition, a venue, such as venue 100, may refer to an indoor and/or outdoor environment where, e.g., navigation services may be deployed. A venue may refer to a physical place or locale that may be associated with the whereabouts of an object or thing (e.g., a user, or a mobile device, etc.) according to a desired or suitable point of reference represented, for example, via geographic coordinates (e.g., latitude, longitude, etc.), a street address, a governmental jurisdiction, a postal zip code, a name, or any combination thereof, etc. Additionally or alternatively, a venue may also include references to an altitude, a time, a direction, a distance, or any combination thereof, etc., just to illustrate other possible implementations. Depending on the particular implementation, a venue may comprise, for example, various partially or substantially enclosed areas associated with an indoor environment, as described in FIG. 1A.

According to aspects of the present disclosure, assistance data may be provided to address various use scenarios. For example, employees and certain visitors may have access to both the retail section 102 and the back-office section 104. Customers may only have access to the retail section 102. For security reasons, it may be beneficial to withhold the presentation map for the back-office section 104 from customers.

Figure 1B:
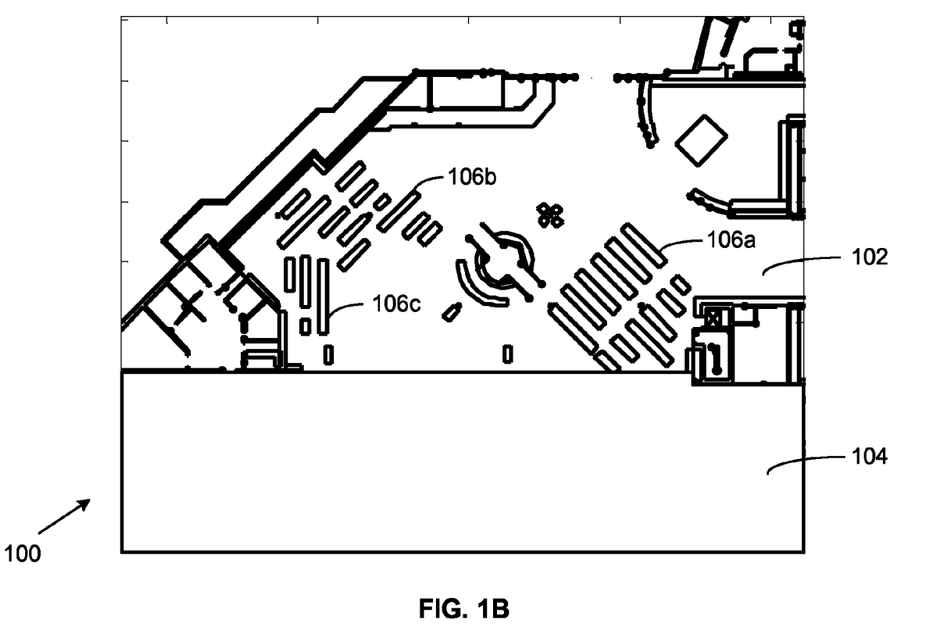
FIG. 1B illustrates another exemplary implementation of providing assistance data of the venue in FIG. 1A according to aspects of the present disclosure.

FIG. 1B illustrates another exemplary implementation of providing assistance data of the venue in FIG. 1A according to aspects of the present disclosure. In the example shown in FIG. 1B, in addition to showing the retail section 102 and back-office section 104, more detailed information of the venue 100, such as 106a, 106b, and 106c may be included in the assistance data, based on a user's privilege to access the venue 100.

According to aspects of the present disclosure, detailed information of a venue, such as venue 100 may include, but are not limited to, walls, doors, railings, or columns; furniture or cubicle dividers; elevators or stairs; or any combination thereof; etc. Detailed information of the venue may exist in the physical world and may have corresponding representation(s) included as part of a schematic map of the venue. For example, if the venue 100 is a book store, detailed information 106a, 106b, and 106c may include locations of book shelves. If the venue 100 is a department store, detailed information 106a, 106b, and 106c may include shelves and displays of merchandises. Although claimed subject matter is not so limited, detailed information of a venue may thus include building features or other objects of the venue. On the other hand, venues may also have open areas such as lobbies, common areas, entryways, or rooms, etc., just to name a few examples.

Figure 1C:
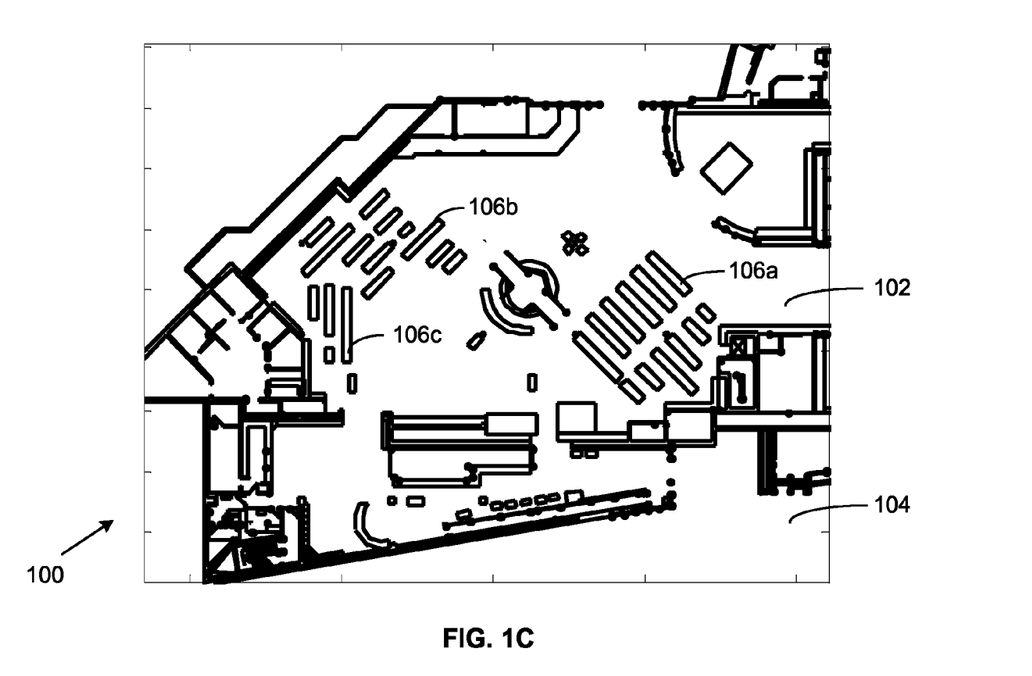
FIG. 1C illustrates yet another exemplary implementation of providing assistance data of the venue in FIG. 1A according to aspects of the present disclosure.

FIG. 1C illustrates yet another exemplary implementation of providing assistance data of the venue in FIG. 1A according to aspects of the present disclosure. As shown in FIG. 1C, in addition to the features shown in FIG. 1B, when a user has privileged to access the back-office section 104, the assistance data to be provided to the user may include more detailed information about the back-office section 104.

Figure 1D:
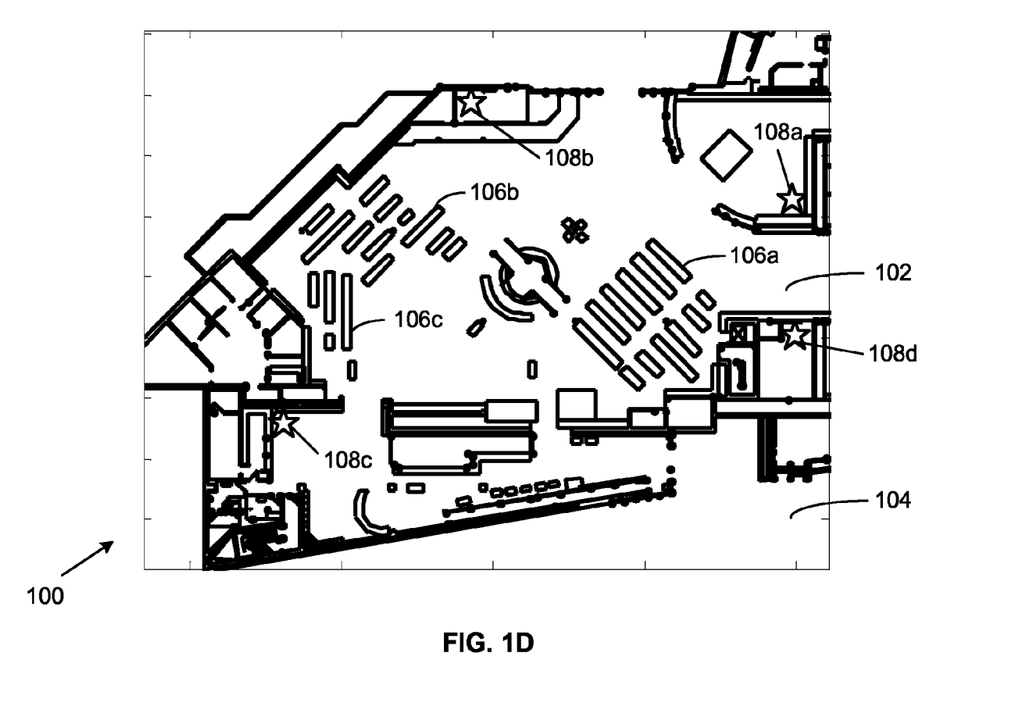
FIG. 1D illustrates yet another exemplary implementation of providing assistance data of the venue in FIG. 1A according to aspects of the present disclosure.

FIG. 1D illustrates yet another exemplary implementation of providing assistance data of the venue in FIG. 1A according to aspects of the present disclosure. In the example shown in FIG. 1D, in addition to the features shown in FIG. 1C, if a user has privilege to access one or more access point devices, shown as 108a, 108b, 108c, and 108d, the assistance data may further include the one or more access point devices in the venue 100.

According to aspects of the present disclosure, information related to the at least one access point devices 108a, 108b, 108c, or 108d may be obtained and provided as assistance data. For example, observations of at least one access point device in the venue can be made; and information observed about the at least one access point device can be compiled. Note that the information observed about the at least one access point device may include, but not limited to, observation time, latitude, longitude, altitude, horizontal uncertainty, and vertical uncertainty. The information observed about the at least one access point device may further include MAC (media access control) address, SSID (service set identifier), RSSI (received signal strength indication), RTT (round-trip time), radio specification and frequency band. The location descriptions may include at least one of GNSS (global navigation satellite system) position measurement information and WiFi position measurement information.

A position measurement may comprise, by way of example only, a radial distance between a mobile device and a wireless transmitter/access point, with the radial distance capable of circumscribing at least a portion of a circle, such as an arc. At least one measured value (e.g., an RTT value, or an RSSI value, etc.) by a mobile device with respect to a wireless transmitter may enable the mobile device to estimate a range between mobile device and wireless transmitter. An RTT may be derived from, for example, one or more communication exchanges between a mobile device and one or more access point devices (108*a*, 108*b*, 108*c*, and 108*d*) in the venue 100.

Note that in the examples shown in FIG. 1A through FIG. 1D, the user in FIG. 1D may have a higher privileged than the user in FIG. 1C; the user in FIG. 1C may have a higher privileged than the user in FIG. 1B; and the user in FIG. 1B in turn may have a higher privileged than the user in FIG. 1A. According to aspects of the present disclosure, a user may have privilege to access certain features but not certain other features. In other words, each user can have a different set of privileges, and the different sets of privileges may not be limited to the examples shown in FIG. 1A through FIG. 1D. For example, a user may have privilege to access the one or more access point devices 108*a*-108*d*, but may not have privilege to access the back-office 104, or vice versa.

Figure 2A:
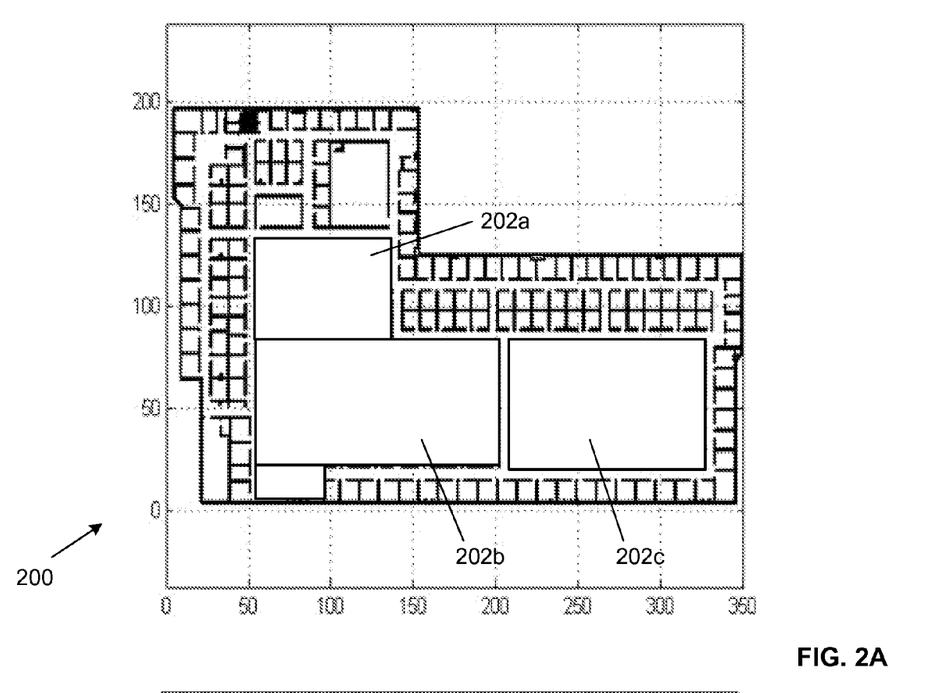
FIG. 2A illustrates an exemplary implementation of providing assistance data of a venue based on a user's privilege to access the venue according to aspects of the present disclosure.

FIG. 2A illustrates an exemplary implementation of providing assistance data of a venue based on a user's privilege to access the venue according to aspects of the present disclosure. As shown in FIG. 2A, a venue, such as venue 200, may include one or more areas 202*a*, 202*b*, and 202*c* that accessibility to these areas may be based on privilege of a particular user and other conditions. For the same venue, such as venue 200, multiple assistance data can be generated. For example, restrictions may be applied by access areas, such as the one or more areas 202*a*, 202*b*, and 202*c*. In some implementations, instead of providing no labels, the one or more areas 202*a*, 202*b*, and 202*c* may be labeled as Restrictive Area A, Restrictive Area B, and Restrictive Area C, respectively, indicating that the particular user with assistance data shown in FIG. 2A may not have privilege to access these areas. In addition, positioning grids, heat maps, and maps can be restricted to certain sections of the venue; and POIs and search features may be restricted based on at least one of user credentials, time-based restrictions, ticket-based restrictions, or loyalty-based restrictions, or any combination thereof.

According to aspects of the present disclosure, positioning assistance data may be provided to determine feasible positions of a mobile device in a venue, such as venue 200. Positions may have corresponding representation(s) included as part of a schematic map of the venue. Positions may also have counterpart locations in the physical world. Positions may be defined to any level of granularity or scale. For example, positions may be one foot, two foot, or ten feet apart, just to name a few examples. Positions may also be organized or arranged in any manner. By way of example only, positions may be organized into a grid of points, which may be associated with a local or global coordinate system and laid over a floor plan or other schematic map of the venue at substantially uniform spacing. A scale of a grid of points (e.g., an interval or distance between adjacent points) may be varied based, at least in part, on user credentials, on time-based restrictions, on ticket-based restrictions, on loyalty-based restrictions, on a desired level of precision for positioning or other location-based services, on an available amount of resources (e.g., memory, processing, etc.), on a size of a schematic map or rooms being covered, on any combination thereof, etc. In one particular implementation, grid points may be placed or positioned at sufficiently regular intervals so as to cover, for example, at least a portion of the venue.

Figure 2B:
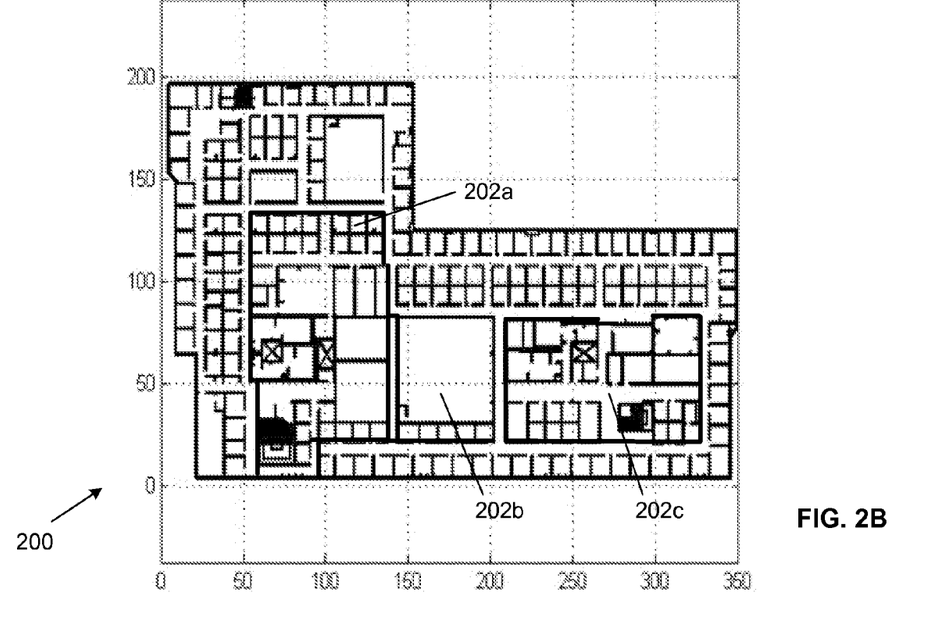
FIG. 2B illustrates another exemplary implementation of providing assistance data of the venue in FIG. 2A based on a user's privilege to access the venue according to aspects of the present disclosure.

FIG. 2B illustrates another exemplary implementation of providing assistance data of the venue in FIG. 2A based on a user's privilege to access the venue according to aspects of the present disclosure. In the example of FIG. 2B, with a different user privilege, additional information may be provided in the assistance data that shows the details of the one or more areas 202*a*, 202*b*, and 202*c*. In some implementations, the one or more areas 202*a*, 202*b*, and 202*c* may be identified, for example Laboratory A, Laboratory B, and Laboratory C, respectively, providing the user who may have privilege to access these areas with assistance data shown in FIG. 2B.

According to aspects of the present disclosure, based on a user's privilege, assistance data may be restricted to major walkways and to the entrances of regions or rooms, and the contents inside such regions or rooms may not be shown to the user who does not have the privilege to access such regions or rooms. Feasible/infeasible regions can be altered based on user credentials, time-based restrictions, ticket-based restrictions, or loyalty-based restrictions, or any combination thereof. If particle filter is used as an implementation of a positioning algorithm in the mobile device, particles may only propagate within the feasible points of the LCI.

Figure 3A:
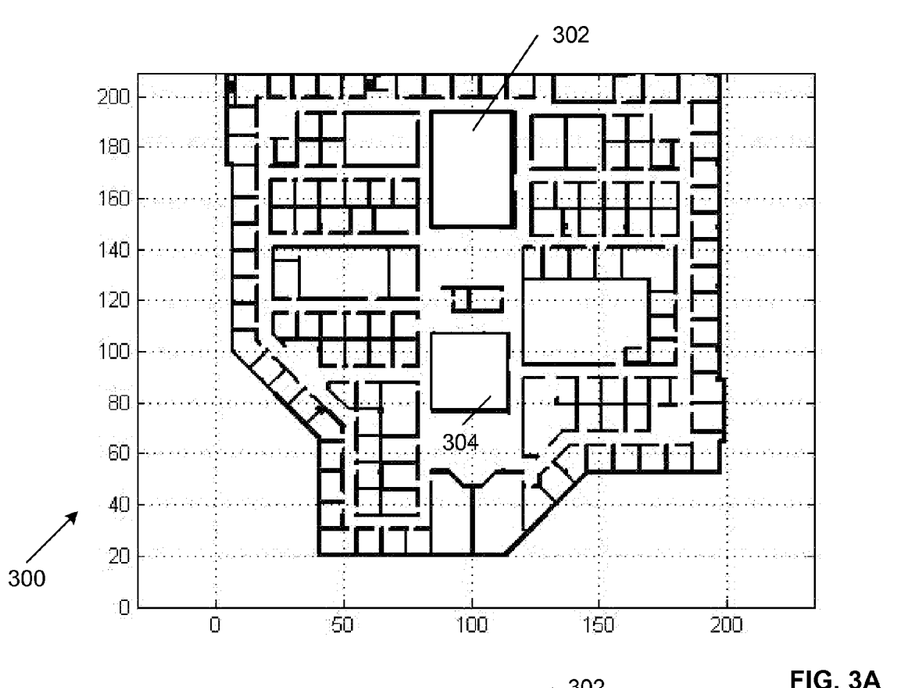
FIG. 3A illustrates another exemplary implementation of providing assistance data of a venue based on a user's privilege to access the venue according to aspects of the present disclosure.

FIG. 3A illustrates another exemplary implementation of providing assistance data of a venue based on a user's privilege to access the venue according to aspects of the present disclosure. In the example shown in FIG. 3A, a visitor to a venue, such as venue 300, may be provided access to certain floors only. In some embodiments, a LCI may be used to represent a floor of the venue 300. In some other embodiments, multiple LCIs may be used to represent a floor of the venue 300. Based on the visitor's credentials, the visitor may be provided with limit access to other indoor positioning enabled LCIs in that venue; time based restrictions on usage of indoor positioning; and/or ticket based restrictions to access certain areas within venue 300. For example, in FIG. 3A, areas 302 and 304 that provide connections between different floors of the venue 300 may be masked out based on a first user's privilege to access the venue 300. On the other hand, in FIG. 3B, information regarding areas 302 and 304 may be provided in the assistance data, showing the stairs and elevators that connect the different floors, in accordance with a second user's valid privilege to access the different floors of venue 300.

Figure 3B:
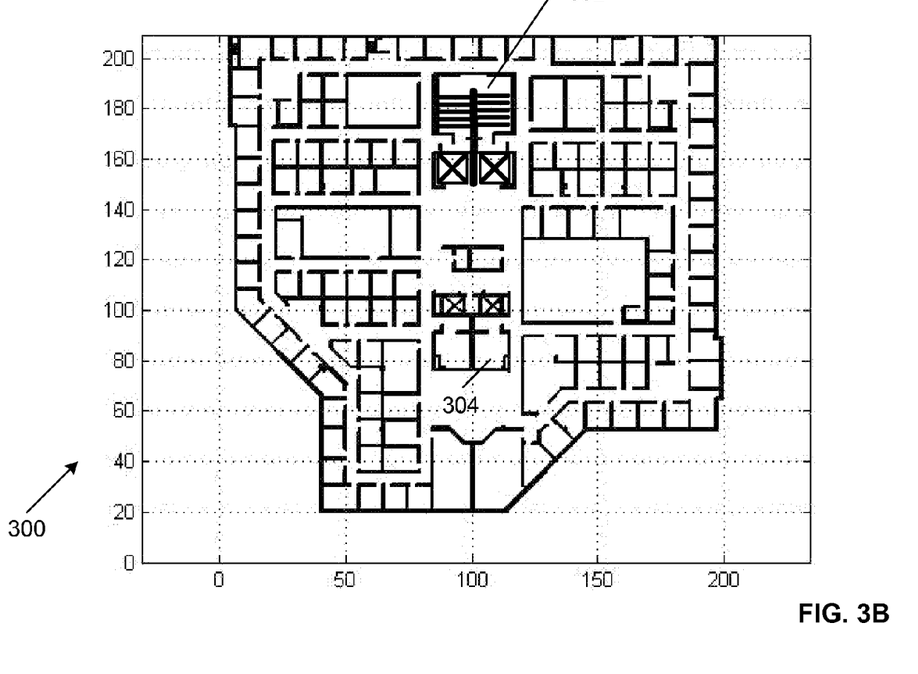
FIG. 3B illustrates yet another exemplary implementation of providing assistance data of the venue in FIG. 3A based on a user's privilege to access the venue according to aspects of the present disclosure.

For another example, if a first user has a basic privilege and is restricted to one LCI in the venue, assistance data that includes information about WiFi access points in the LCI may be provided to this user. Assistance data that relates to barometer based LCI disambiguation may be withheld from this user. On the other hand, if a second user has a premium privilege to access multiple LCIs on different floors of the venue, assistance data that relates to barometer based LCI disambiguation may be provided to this second user, in addition to the assistance data that may be provided to the first user. The assistance data may include delta heights between levels, number of levels, transition matrix, or combinations thereof. Additionally or alternatively, if a user is restricted to access a few LCIs, candidate LCIs may be sent from a map server to the user's mobile device. The user reported visible MAC IDs can be restricted to those LCIs. As shown in the above example, by providing assistance data based on a user's privilege to access a venue, multiple levels of services may be provided to different users in accordance with their corresponding privileges to access the venue. In the case when the first user has a basic privilege, the size of assistance data to be provided to this user may be reduced, which in turn can reduce the amount of data to be transmitted and stored. In the case when the second user has a premium privilege, additional information may be included in the assistance data to be provided to this user, which in turn can be used to improve user experience for the second user at the venue.

According to aspects of the present disclosure, various types of user credentials may be employed, including but not limited to time-based restrictions, ticket-based restrictions, or loyalty-based restrictions, or any combination thereof. Depending on the time when the user has access to the venue, assistance data may be provided for restricted regions. For example, airport terminals may close first, then food courts, and then security areas. Employees may get complete assistance data while travelers may not.

For an example of ticket-based restrictions, a user could have an e-ticket to a venue such as a museum or amusement park. Assistance data may be provided based on the validity of the ticket. Tickets may be valid for entering the venue but may not be valid for visiting certain exhibit halls. In that case, assistance data provided may not cover such exhibit halls.

Figure 4:
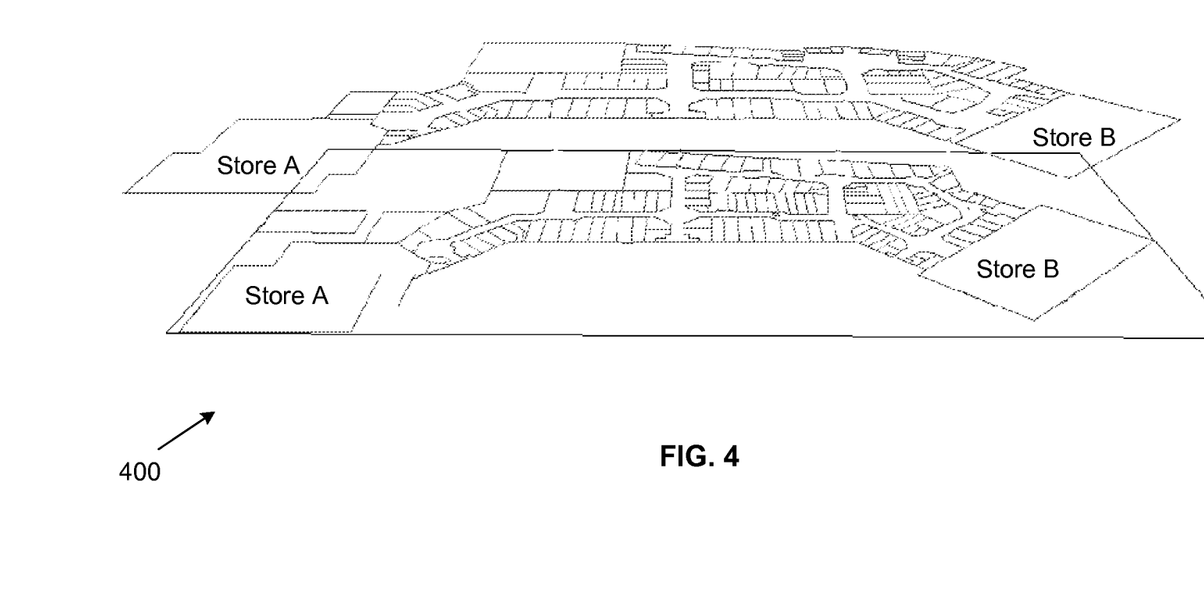
FIG. 4 illustrates yet another exemplary implementation of providing assistance data of a venue based on a user's privilege to access the venue according to aspects of the present disclosure.

FIG. 4 illustrates yet another exemplary implementation of providing assistance data of a venue based on a user's privilege to access the venue according to aspects of the present disclosure. In the example of FIG. 4, venue 400 may implement loyalty-based restrictions, based on users' privileges. For example, when a mobile device, which has been authenticated with a loyalty program offered by venue 400, requests for indoor positioning, it may get a more detailed assistance data (e.g., more access points, more detailed maps, etc.) than mobile devices that have not been authenticated with the loyalty program. Similar methods may be applied to multi-tenant venues such as a shopping mall, where registered users of the shopping mall's client application may get an upgraded assistance data while non-registered users may get a basic assistance data. For example, with the upgraded assistance data, registered users may have enhanced search capabilities, such as searching for particular points of interest using the upgraded assistance data. For instances, with enhanced search capabilities, registered users may be able to obtain a map showing the stores offering food services or obtain a map showing the stores selling shoes in venue 400.

Figure 5:
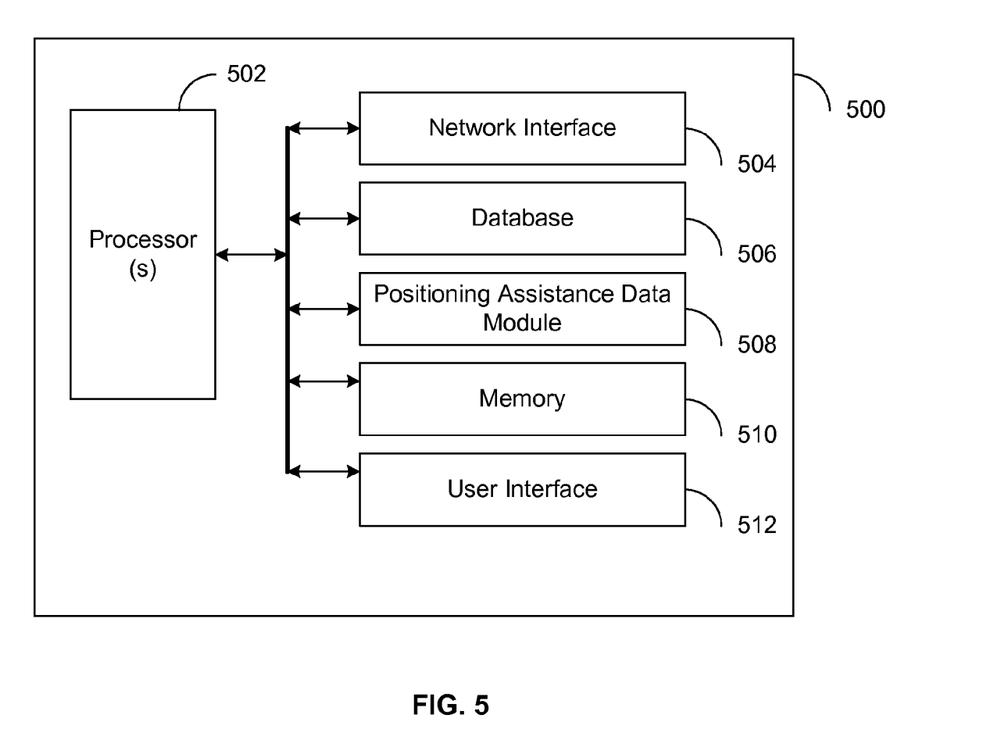
FIG. 5 illustrates an exemplary apparatus for providing positioning assistance data according to aspects of the present disclosure.

FIG. 5 illustrates an exemplary apparatus for providing positioning assistance data according to aspects of the present disclosure. In the example shown in FIG. 5, apparatus 500 may include one or more processors 502, network interface 504, database 506, positioning assistance data module 508, memory 510, and user interface 512. The one or more processors 502 can be configured to control operations of the apparatus 500. The network interface 504 can be configured to communicate with a network (not shown), which may be configured to communicate with servers, computers, and mobile devices on the network. Database 506 can be configured to store user credentials, membership registrations, as well as maps, directories, floor plans, searchable terms, images, and other information of the venue. The one or more processors 502 and/or the positioning assistance data module 508 can be configured to implement methods of providing positioning assistance data. For example, working with the processor(s) 502, the positioning assistance data module 508 can be configured to implement methods described in association with FIG. 1 to FIG. 4, and FIGS. 6A-6D. Memory 510 can be configured to store program codes, instructions, and data for the apparatus 500. User interface 512 may be configured to enable interactions between apparatus 500 and a user. According to aspects of the present disclosure, the apparatus 500 may be implemented as a part of a server. In that implementation, the positioning assistance data may be communicated to mobile devices via the network interface 504. According to other aspects of the present disclosure, the apparatus 500 may be implemented as a part of a mobile device. In that implementation, the positioning assistance data may be used by the mobile device and/or may be communicated to other mobile devices or servers via the network interface 504. In yet other implementations, some blocks of the apparatus 500 may be implemented in a mobile device and some blocks of the apparatus 500 may be in a server. These implementations or any combinations thereof are within the scope of the present disclosure.

Figure 6A:
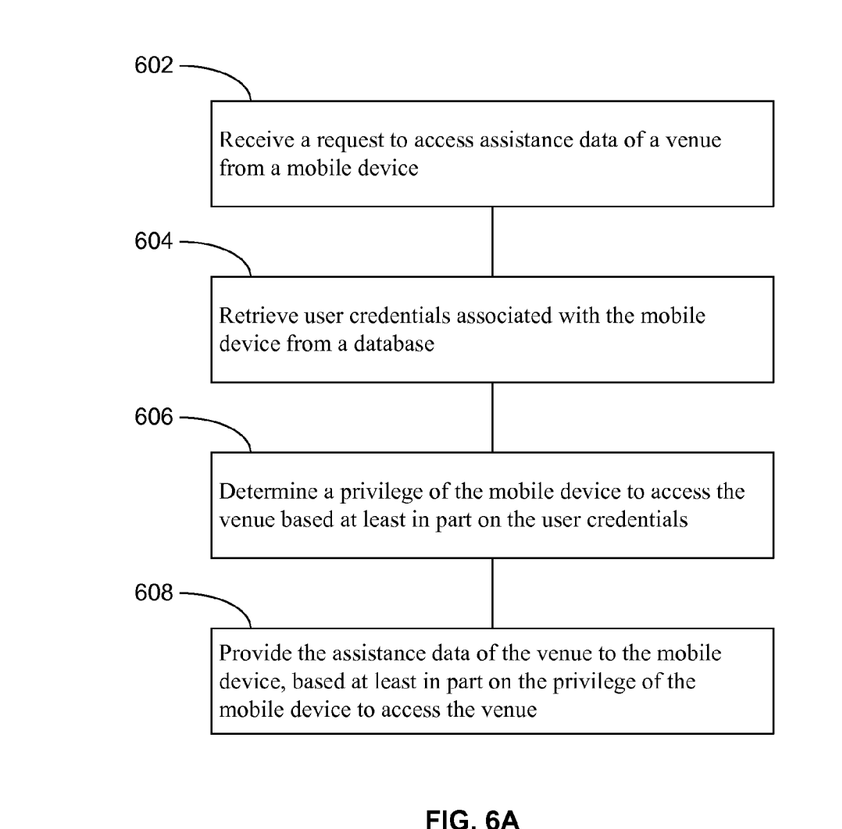
FIG. 6A illustrates an exemplary flow chart for implementing methods of providing user-based assistance data according to aspects of the present disclosure.

FIG. 6A illustrates another exemplary flow chart for implementing methods of providing assistance data of a venue to a mobile device according to aspects of the present disclosure. In the exemplary implementation shown in FIG. 6A, in block 602, the method receives a request to access the assistance data of a venue from a mobile device. In block 604, the method retrieves user credentials associated with the mobile device from a database. In block 606, the method determines a privilege of the mobile device to access the venue based at least in part on the user credentials. In block 608, the method provides the assistance data of the venue to the mobile device, based at least in part on the privilege of the mobile device to access the venue.

Figure 6B:
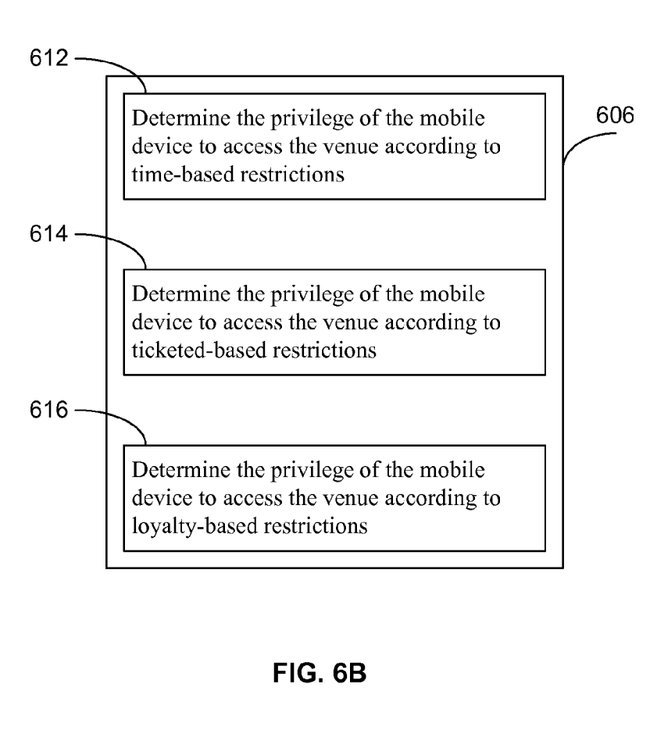
FIG. 6B illustrates an exemplary implementation for determining the privilege of a mobile device to access a venue according to aspects of the present disclosure.

According to aspects of the present disclose, the methods performed in block 606 may further include the methods performed in block 612, block 614, block 616, or two or more blocks from 612 to 616. FIG. 6B illustrates an exemplary implementation for determining the privilege of a mobile device to access a venue according to aspects of the present disclosure. As shown in FIG. 6B, in block 612, the method determines the privilege of the mobile device to access the venue according to time-based restrictions. In block 614, the method determines the privilege of the mobile device to access the venue according to ticket-based restrictions. In block 616, the method determines the privilege of the mobile device to access the venue according to loyalty-based restrictions.

Figure 6C:
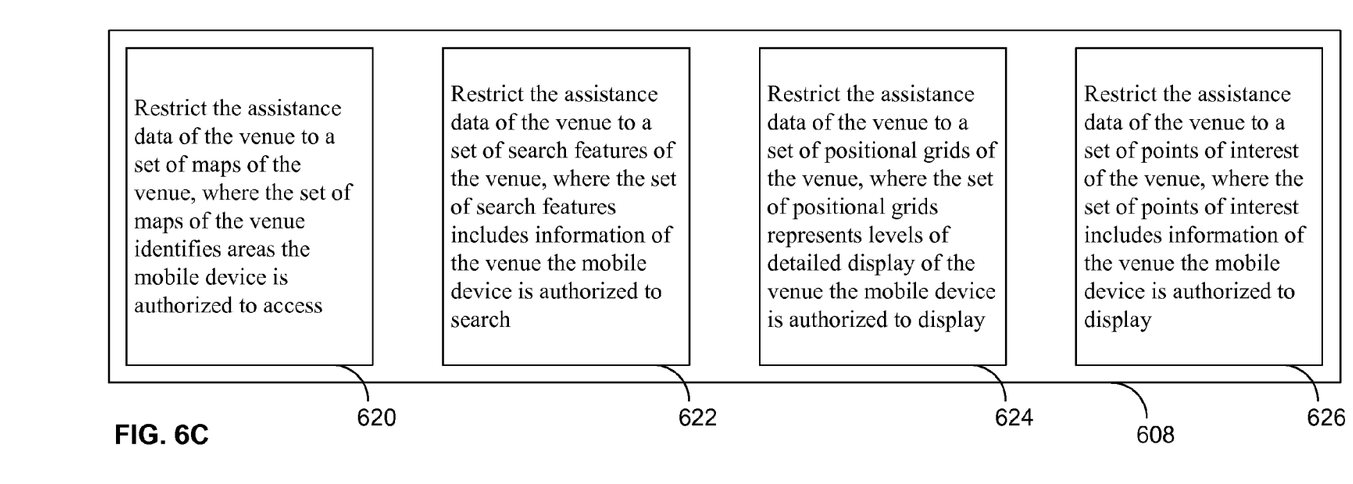
FIG. 6C illustrates an exemplary implementation for providing assistance data of a venue to a mobile device according to aspects of the present disclosure.

FIG. 6C illustrates an exemplary implementation for providing assistance data of a venue to a mobile device according to aspects of the present disclosure. According to aspects of the present disclose, the methods performed in block 608 may further include the methods performed in block 620, block 622, block 624, block 626, or any two or more blocks from 620 to 626. In the example shown in FIG. 6C, in block 620, the method restricts the assistance data of the venue to a set of maps of the venue, where the set of maps of the venue identifies areas the mobile device is authorized to access. In block 622, the method restricts the assistance data of the venue to a set of search features of the venue, where the set of search features includes information of the venue the mobile device is authorized to search. In block 624, the method restricts the assistance data of the venue to a set of positional grids of the venue, where the set of positional grids represents levels of detailed display of the venue the mobile device is authorized to display. In block 626, the method restricts the assistance data of the venue to a set of points of interest of the venue, where the set of points of interest includes information of the venue the mobile device is authorized to display.

Figure 6D:
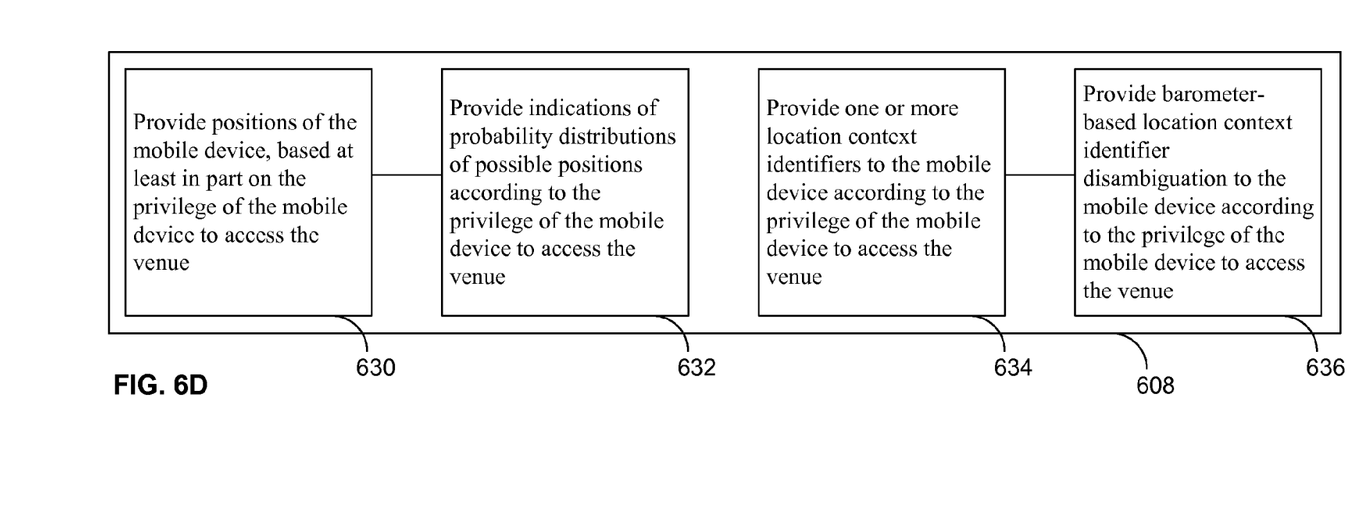
FIG. 6D illustrates another exemplary implementation for providing assistance data of a venue to a mobile device according to aspects of the present disclosure.

FIG. 6D illustrates another exemplary implementation for providing assistance data of a venue to a mobile device according to aspects of the present disclosure. According to aspects of the present disclose, the methods performed in block 608 may further include the methods performed in block 630 and/or the methods performed in block 634. In addition, the methods performed in block 630 may include the methods performed in block 632, and the methods performed in block 634 may include the methods performed in block 636. In the exemplary implementation shown in FIG. 6D, in block 630, the method provides positions of the mobile device, based at least in part on the privilege of the mobile device to access the venue. For example, in network based positioning implementations, a server may determine the position of the mobile device and then provide the position to the mobile device. In other implementations, the mobile device may receive the assistance data and use the assistance data to determine its position. In block 632, the method provides indications of probability distributions of possible positions according to the privilege of the mobile device to access the venue. In block 634, the method provides one or more location context identifiers to the mobile device according to the privilege of the mobile device to access the venue. In block 636, the method provides barometer-based location context identifier disambiguation to the mobile device according to the privilege of the mobile device to access the venue, where the barometer-based location context identifier disambiguation includes number of levels, heights between levels, or transition matrix between levels of the venue, or combinations thereof.

Figure 7:
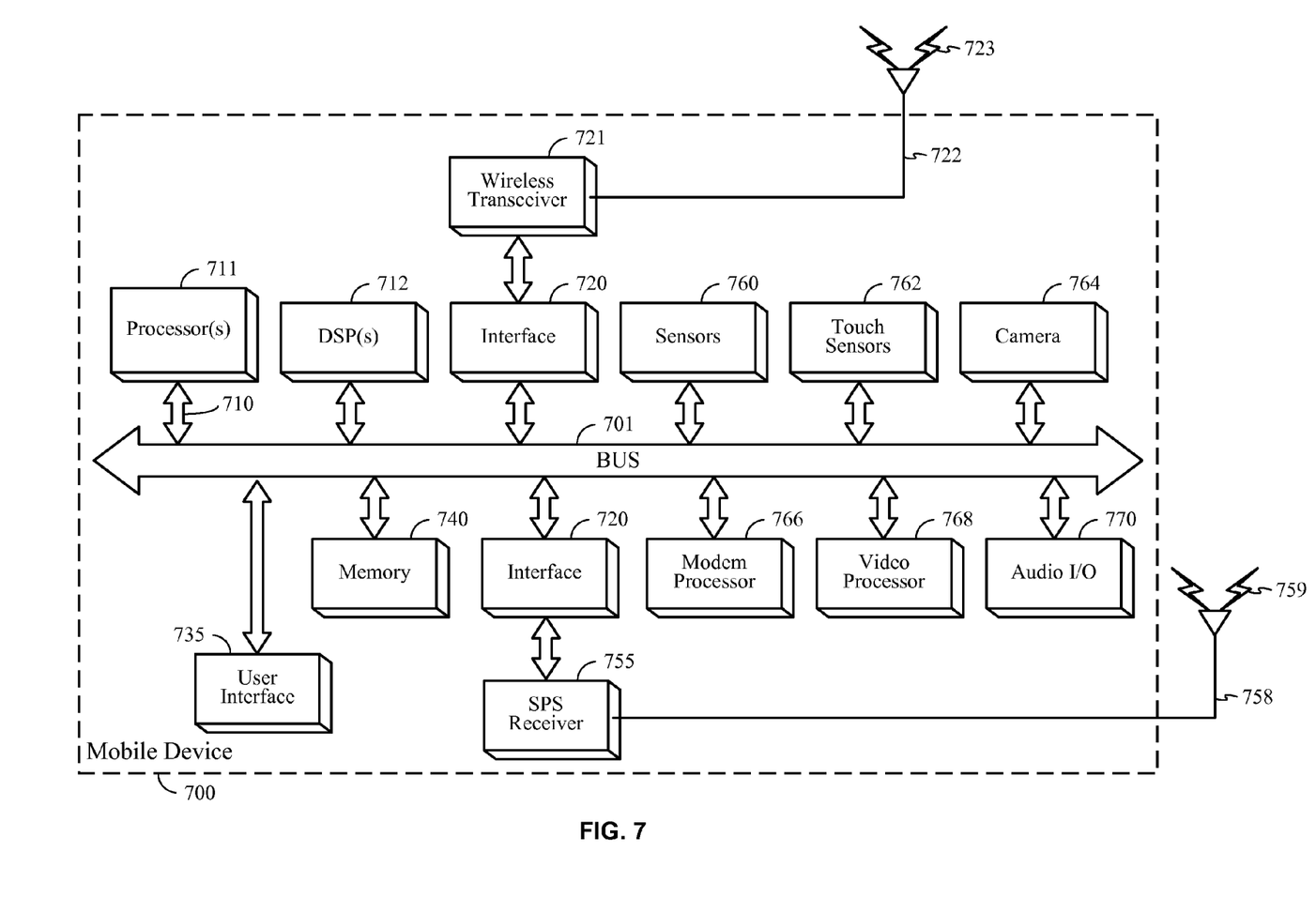
FIG. 7 illustrates an exemplary block diagram of a mobile device according to aspects of the present disclosure.

FIG. 7 illustrates an exemplary block diagram of a mobile device according to aspects of the present disclosure. As shown in FIG. 7, mobile device 700 may comprise one or more features of the one or more mobile devices as described in association with FIGS. 1A-1D, FIG. 5 and FIGS. 6A-6D. In certain embodiments, mobile device 700 may also comprise a wireless transceiver 721 which is capable of transmitting and receiving wireless signals 723 via wireless antenna 722 over a wireless communication network. Wireless transceiver 721 may be connected to bus 701 by a wireless transceiver bus interface 720. Wireless transceiver bus interface 720 may, in some embodiments be at least partially integrated with wireless transceiver 721. Some embodiments may include multiple wireless transceivers 721 and wireless antennas 722 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth, etc.

According to aspects of the present disclosure, wireless transceiver 721 may comprise a transmitter and a receiver. The transmitter and the receiver may be implemented to share common circuitry, or may be implemented as separate circuits. Mobile device 700 may also comprise SPS receiver 755 capable of receiving and acquiring SPS signals 759 via SPS antenna 758. SPS receiver 755 may also process, in whole or in part, acquired SPS signals 759 for estimating a location of mobile device 700. In some embodiments, processor(s) 711, memory 740, DSP(s) 712 and/or specialized processors (not shown) may also be utilized to process acquired SPS signals, in whole or in part, and/or calculate an estimated location of mobile device 700, in conjunction with SPS receiver 755. Storage of SPS or other signals for use in performing positioning operations may be performed in memory 740 or registers (not shown).

Also shown in FIG. 7, mobile device 700 may comprise digital signal processor(s) (DSP(s)) 712 connected to the bus 701 by a bus interface 710, processor(s) 711 connected to the bus 701 by a bus interface 710 and memory 740. Bus interface 710 may be integrated with the DSP(s) 712, processor(s) 711 and memory 740. In various embodiments, functions may be performed in response execution of one or more machine-readable instructions stored in memory 740 such as on a computer-readable storage medium, such as RAM, ROM, FLASH, or disc drive, just to name a few example. The one or more instructions may be executable by processor(s) 711, specialized processors, or DSP(s) 712. Memory 740 may comprise a non-transitory processor-readable memory and/or a computer-readable memory that stores software code (programming code, instructions, etc.) that are executable by processor(s) 711 and/or DSP(s) 712 to perform functions described herein. In a particular implementation, wireless transceiver 721 may communicate with processor(s) 711 and/or DSP(s) 712 through bus 701 to enable mobile device 700 to be configured as a wireless mobile device as discussed above. Processor(s) 711 and/or DSP(s) 712 may execute instructions to execute one or more aspects of processes/methods discussed above in connection with FIGS. 6A-6D.

Also shown in FIG. 7, a user interface 735 may comprise any one of several devices such as, for example, a speaker, microphone, display device, vibration device, keyboard, touch screen, etc. In a particular implementation, user interface 735 may enable a user to interact with one or more applications hosted on mobile device 700. For example, devices of user interface 735 may store analog or digital signals on memory 740 to be further processed by DSP(s) 712 or processor 711 in response to action from a user. Similarly, applications hosted on mobile device 700 may store analog or digital signals on memory 740 to present an output signal to a user. In another implementation, mobile device 700 may optionally include a dedicated audio input/output (I/O) device 770 comprising, for example, a dedicated speaker, microphone, digital to analog circuitry, analog to digital circuitry, amplifiers and/or gain control. In another implementation, mobile device 700 may comprise touch sensors 762 responsive to touching or pressure on a keyboard or touch screen device.

Mobile device 700 may also comprise a dedicated camera device 764 for capturing still or moving imagery. Dedicated camera device 764 may comprise, for example an imaging sensor (e.g., charge coupled device or CMOS imager), lens, analog to digital circuitry, frame buffers, etc. In one implementation, additional processing, conditioning, encoding or compression of signals representing captured images may be performed at processor 711 or DSP(s) 712. Alternatively, a dedicated video processor 768 may perform conditioning, encoding, compression or manipulation of signals representing captured images. Additionally, dedicated video processor 768 may decode/decompress stored image data for presentation on a display of mobile device 700.

Mobile device 700 may also comprise sensors 760 coupled to bus 701 which may include, for example, inertial sensors and environment sensors. Inertial sensors of sensors 760 may comprise, for example accelerometers (e.g., collectively responding to acceleration of mobile device 700 in three dimensions), one or more gyroscopes or one or more magnetometers (e.g., to support one or more compass applications). Environment sensors of mobile device 700 may comprise, for example, temperature sensors, barometric pressure sensors, ambient light sensors, and camera imagers, microphones, just to name few examples. Sensors 760 may generate analog or digital signals that may be stored in memory 740 and processed by DPS(s) or processor 711 in support of one or more applications such as, for example, applications directed to positioning or navigation operations.

In a particular implementation, mobile device 700 may comprise a dedicated modem processor 766 capable of performing baseband processing of signals received and down-converted at wireless transceiver 721 or SPS receiver 755. Similarly, dedicated modem processor 766 may perform baseband processing of signals to be up-converted for transmission by wireless transceiver 721. In alternative implementations, instead of having a dedicated modem processor, baseband processing may be performed by a processor or DSP (e.g., processor 711 or DSP(s) 712).

Note that at least the following three paragraphs, FIGS. 1A-1D, FIG. 5, FIGS. 6A-6D, FIG. 7 and their corresponding descriptions provide means for means for receiving a request to access assistance data of a venue from a mobile device; means for retrieving user credentials associated with the mobile device; means for determining a privilege of the mobile device to access the venue based at least in part on the user credentials; means for providing the assistance data of the venue to the mobile device, based at least in part on the privilege of the mobile device to access the venue; means for determining the privilege of the mobile device to access the venue according to time-based restrictions; means for determining the privilege of the mobile device to access the venue according to ticket-based restrictions; means for determining the privilege of the mobile device to access the venue according to loyalty-based restrictions; means for restricting the assistance data of the venue to a set of maps of the venue; means for restricting the assistance data of the venue to a set of search features of the venue; means for restricting the assistance data of the venue to a set of positional grids of the venue; means for restricting the assistance data of the venue to a set of points of interest of the venue; means for providing positions of the mobile device, based at least in part on the privilege of the mobile device to access the venue; and means for providing indications of probability distributions of possible positions according to the privilege of the mobile device to access the venue.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

We claim:

1. A method of providing assistance data of a venue by a server, comprising:
   receiving a request to access the assistance data of the venue from a mobile device;
   retrieving user credentials associated with the mobile device;
   determining a privilege of the mobile device to access the venue based at least in part on the user credentials; and
   providing the assistance data of the venue to the mobile device, based at least in part on the privilege of the mobile device to access the venue, wherein the providing the assistance data of the venue further comprises at least one of:
   restricting the assistance data of the venue to a set of search features of the venue, wherein the set of search features includes information of the venue the mobile device is authorized to search, wherein the information of the venue the mobile device is authorized to search is determined by the server;
   restricting the assistance data of the venue to a set of positional grids of the venue, wherein the set of positional grids represents levels of detailed display of the venue the mobile device is authorized to display; or some combination thereof.

2. The method of claim 1, wherein the determining the privilege of the mobile device to access the venue further comprises at least one of:
   determining the privilege of the mobile device to access the venue according to time-based restrictions;
   determining the privilege of the mobile device to access the venue according to ticket-based restrictions; or
   determining the privilege of the mobile device to access the venue according to loyalty-based restrictions.

3. The method of claim 1, wherein the providing the assistance data of the venue comprises:
   restricting the assistance data of the venue to a set of maps of the venue, wherein the set of maps of the venue identifies areas the mobile device is authorized to access.

4. The method of claim 1, wherein the providing the assistance data of the venue further comprises:
   restricting the assistance data of the venue to a set of points of interest of the venue, wherein the set of points of interest includes information of the venue the mobile device is authorized to display.

5. The method of claim 1, wherein the providing the assistance data of the venue to the mobile device further comprises:
   providing positions of the mobile device, based at least in part on the privilege of the mobile device to access the venue.

6. The method of claim 5, wherein the providing positions of the mobile device comprises:
   providing indications of probability distributions of possible positions according to the privilege of the mobile device to access the venue.

7. The method of claim 1, wherein the providing the assistance data of the venue to the mobile device further comprises:
   providing one or more location context identifiers to the mobile device according to the privilege of the mobile device to access the venue.

8. The method of claim 7, wherein the providing the one or more location context identifiers to the mobile device comprises:
   providing barometer-based location context identifier disambiguation to the mobile device according to the privilege of the mobile device to access the venue, wherein the barometer-based location context identifier disambiguation includes number of levels, heights between levels, or transition matrix between levels of the venue, or combinations thereof.

9. An apparatus for providing assistance data of a venue, comprising:
- a database configured to store user credentials;
- one or more processors that include processing logic, the processing logic comprises
- logic configured to receive a request to access assistance data of the venue from a mobile device;
- logic configured to retrieve the user credentials associated with the mobile device from the database;
- logic configured to determine a privilege of the mobile device to access the venue based at least in part on the user credentials;
- logic configured to provide the assistance data of the venue to the mobile device, based at least in part on the privilege of the mobile device to access the venue, wherein the logic configured to provide the assistance data of the venue further comprises at least one of:
- logic configured to restrict the assistance data of the venue to a set of search features of the venue, wherein the set of search features includes information of the venue the mobile device is authorized to search, wherein the information of the venue the mobile device is authorized to search is determined by the apparatus, and the apparatus is a server of the venue;
- logic configured to restrict the assistance data of the venue to a set of positional grids of the venue, wherein the set of positional grids represents levels of detailed display of the venue the mobile device is authorized to display; or some combination thereof; and
- a memory configured to store the assistance data of the venue.

10. The apparatus of claim 9, wherein the logic configured to determine the privilege of the mobile device to access the venue further comprises at least one of:
- logic configured to determine the privilege of the mobile device to access the venue according to time-based restrictions;
- logic configured to determine the privilege of the mobile device to access the venue according to ticket-based restrictions; or
- logic configured to determine the privilege of the mobile device to access the venue according to loyalty-based restrictions.

11. The apparatus of claim 9, wherein the logic configured to provide the assistance data of the venue comprises:
- logic configured to restrict the assistance data of the venue to a set of maps of the venue, wherein the set of maps of the venue identifies areas the mobile device is authorized to access.

12. The apparatus of claim 9, wherein the logic configured to provide the assistance data of the venue further comprises:
- logic configured to restrict the assistance data of the venue to a set of points of interest of the venue, wherein the set of points of interest includes information of the venue the mobile device is authorized to display.

13. The apparatus of claim 9, wherein the logic configured to provide the assistance data of the venue to the mobile device further comprises:
- logic configured to provide positions of the mobile device, based at least in part on the privilege of the mobile device to access the venue.

14. The apparatus of claim 13, wherein the logic configured to provide positions of the mobile device comprises:
- logic configured to provide indications of probability distributions of possible positions according to the privilege of the mobile device to access the venue.

15. The apparatus of claim 9, wherein the logic configured to provide the assistance data of the venue to the mobile device further comprises:
- logic configured to provide one or more location context identifiers to the mobile device according to the privilege of the mobile device to access the venue.

16. The apparatus of claim 15, wherein the logic configured to provide the one or more location context identifiers to the mobile device comprises:
- logic configured to provide barometer-based location context identifier disambiguation to the mobile device according to the privilege of the mobile device to access the venue, wherein the barometer-based location context identifier disambiguation includes number of levels, heights between levels, or transition matrix between levels of the venue, or combinations thereof.

17. A computer program product comprising non-transitory medium storing instructions for execution by a server of a venue, the instructions comprising:
- instructions for receiving a request to access assistance data of the venue from a mobile device;
- instructions for retrieving user credentials associated with the mobile device;
- instructions for determining a privilege of the mobile device to access the venue based at least in part on the user credentials; and
- instructions for providing the assistance data of the venue to the mobile device, based at least in part on the privilege of the mobile device to access the venue, wherein the instructions for providing the assistance data of the venue further comprises at least one of:
- instructions for restricting the assistance data of the venue to a set of search features of the venue, wherein the set of search features includes information of the venue the mobile device is authorized to search, wherein the information of the venue the mobile device is authorized to search is determined by the server;
- instructions for restricting the assistance data of the venue to a set of positional grids of the venue, wherein the set of positional grids represents levels of detailed display of the venue the mobile device is authorized to display; or some combination thereof.

18. The computer program product of claim 17, wherein the instructions for determining the privilege of the mobile device to access the venue further comprises at least one of:
- instructions for determining the privilege of the mobile device to access the venue according to time-based restrictions;
- instructions for determining the privilege of the mobile device to access the venue according to ticket-based restrictions; or
- instructions for determining the privilege of the mobile device to access the venue according to loyalty-based restrictions.

19. The computer program product of claim 17, wherein the instructions for providing the assistance data of the venue comprises:
- instructions for restricting the assistance data of the venue to a set of maps of the venue, wherein the set of maps of the venue identifies areas the mobile device is authorized to access.

20. The computer program product of claim 17, wherein the instructions for providing the assistance data of the venue further comprises:
- instructions for restricting the assistance data of the venue to a set of points of interest of the venue, wherein the set of points of interest includes information of the venue the mobile device is authorized to display.

21. The computer program product of claim 17, wherein the instructions for providing the assistance data of the venue to the mobile device further comprises:
    instructions for providing positions of the mobile device, based at least in part on the privilege of the mobile device to access the venue.

22. The computer program product of claim 21, wherein the instructions for providing positions of the mobile device comprises:
    instructions for providing indications of probability distributions of possible positions according to the privilege of the mobile device to access the venue.

23. The computer program product of claim 17, wherein the instructions for providing the assistance data of the venue to the mobile device further comprises:
    instructions for providing one or more location context identifiers to the mobile device according to the privilege of the mobile device to access the venue.

24. The computer program product of claim 23, wherein the instructions for providing the one or more location context identifiers to the mobile device comprises:
    instructions for providing barometer-based location context identifier disambiguation to the mobile device according to the privilege of the mobile device to access the venue, wherein the barometer-based location context identifier disambiguation includes number of levels, heights between levels, or transition matrix between levels of the venue, or combinations thereof.

25. An apparatus for providing assistance data of a venue, comprising:
    means for receiving a request to access assistance data of the venue from a mobile device;
    means for retrieving user credentials associated with the mobile device;
    means for determining a privilege of the mobile device to access the venue based at least in part on the user credentials; and
    means for providing the assistance data of the venue to the mobile device, based at least in part on the privilege of the mobile device to access the venue, wherein the means for providing the assistance data of the venue further comprises at least one of:
    means for restricting the assistance data of the venue to a set of search features of the venue, wherein the set of search features includes information of the venue the mobile device is authorized to search, wherein the information of the venue the mobile device is authorized to search is determined by the apparatus, and the apparatus is a server of the venue;
    means for restricting the assistance data of the venue to a set of positional grids of the venue, wherein the set of positional grids represents levels of detailed display of the venue the mobile device is authorized to display; or some combination thereof.

26. The apparatus of claim 25, wherein the means for determining the privilege of the mobile device to access the venue further comprises at least one of:
    means for determining the privilege of the mobile device to access the venue according to time-based restrictions;
    means for determining the privilege of the mobile device to access the venue according to ticket-based restrictions; or
    means for determining the privilege of the mobile device to access the venue according to loyalty-based restrictions.

27. The apparatus of claim 25, wherein the means for providing the assistance data of the venue comprises:
    means for restricting the assistance data of the venue to a set of maps of the venue, wherein the set of maps of the venue identifies areas the mobile device is authorized to access.

28. The apparatus of claim 25, wherein the means for providing the assistance data of the venue further comprises:
    means for restricting the assistance data of the venue to a set of points of interest of the venue, wherein the set of points of interest includes information of the venue the mobile device is authorized to display.

29. The apparatus of claim 25, wherein the means for providing the assistance data of the venue to the mobile device further comprises:
    means for providing positions of the mobile device, based at least in part on the privilege of the mobile device to access the venue.

30. The apparatus of claim 29, wherein the means for providing positions of the mobile device comprises:
    means for providing indications of probability distributions of possible positions according to the privilege of the mobile device to access the venue.

* * * * *